(12) United States Patent  
Chen

(10) Patent No.: US 8,684,123 B2
(45) Date of Patent: Apr. 1, 2014

(54) LOW-PROFILE TWO-WHEELED SELF-BALANCING VEHICLE WITH EXTERIOR FOOT PLATFORMS

(71) Applicant: Shane Chen, Camas, WA (US)

(72) Inventor: Shane Chen, Camas, WA (US)

(*) Notice: Subject to any disclaimer, the term of this patent is extended or adjusted under 35 U.S.C. 154(b) by 0 days.

(21) Appl. No.: 13/736,051

(22) Filed: Jan. 7, 2013

(65) Prior Publication Data
US 2013/0228385 A1    Sep. 5, 2013

Related U.S. Application Data

(63) Continuation-in-part of application No. 13/312,307, filed on Dec. 6, 2011, which is a continuation-in-part of application No. 13/196,675, filed on Aug. 2, 2011, now Pat. No. 8,584,782.

(51) Int. Cl.
*B62D 61/00* (2006.01)
(52) U.S. Cl.
USPC .......................................... 180/218; 180/6.5

(58) Field of Classification Search
USPC ............................................ 180/218, 6.48, 6.5
See application file for complete search history.

(56) References Cited

U.S. PATENT DOCUMENTS

| | | | | |
|---|---|---|---|---|
| 7,717,200 | B2* | 5/2010 | Kakinuma et al. | 180/6.5 |
| 8,162,328 | B2* | 4/2012 | Horiguchi et al. | 280/5.509 |
| 2007/0251735 | A1* | 11/2007 | Kakinuma et al. | 180/6.5 |
| 2008/0147281 | A1* | 6/2008 | Ishii et al. | 701/49 |
| 2009/0032323 | A1* | 2/2009 | Kakinuma et al. | 180/218 |
| 2010/0025139 | A1* | 2/2010 | Kosaka et al. | 180/218 |
| 2010/0071984 | A1* | 3/2010 | Doi et al. | 180/218 |
| 2010/0121538 | A1* | 5/2010 | Ishii et al. | 701/48 |

* cited by examiner

*Primary Examiner* — Kevin Hurley

(57) ABSTRACT

A personal vehicle having two wheels that are arranged substantially side-by-side and connected by a linkage mechanism to one another. The linkage mechanism supports the wheels in a substantially parallel relationship as the two wheels tilt from side to side. A foot placement platform is associated with each wheel, as is a motor to drive the wheels. Gyroscopic sensors are used to in driving the wheels to maintain an upright position. Various embodiments are disclosed including folding platforms, a parallelogram linkage structure, handles and/or seats that may extend above the wheels, lower leg contact surface, and other features.

20 Claims, 13 Drawing Sheets

Fig 12
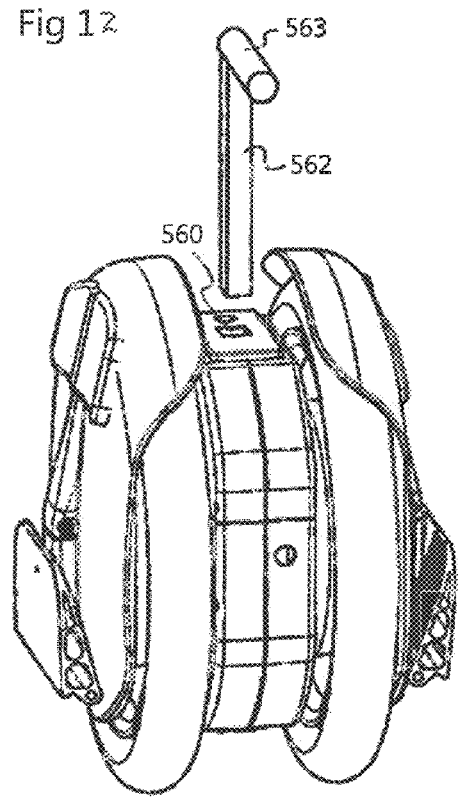
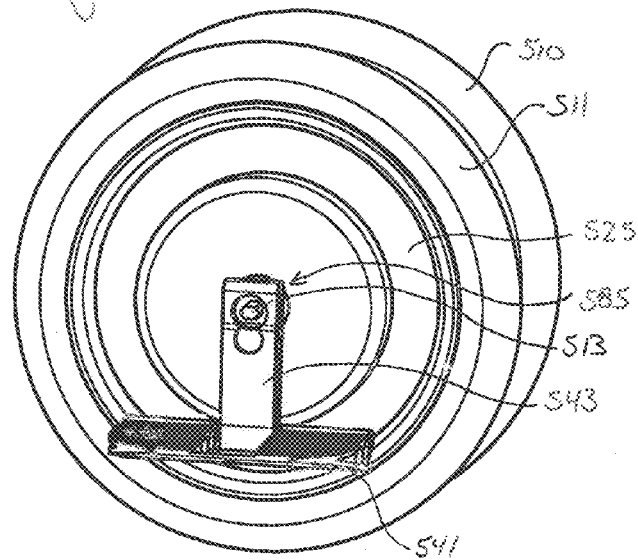
Fig. 11
Fig 13
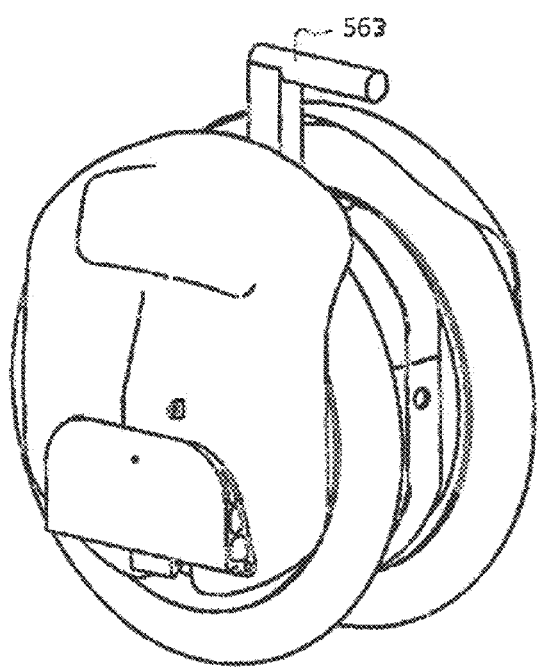

_US 8,684,123 B2_

LOW-PROFILE TWO-WHEELED SELF-BALANCING VEHICLE WITH EXTERIOR FOOT PLATFORMS

CROSS REFERENCE TO RELATED APPLICATIONS

This application is a continuation-in-part of U.S. patent application Ser. No. 13/312,307, entitled Two-Wheeled Self-Balancing Motorized Personal Vehicle with Tilting Wheels, filed Dec. 6, 2011, by Shane Chen, which in turn is a continuation-in-part of U.S. patent application Ser. No. 13/196,675, entitled Two-Wheeled Self-Balancing Motorized Personal Vehicle with Tilting Wheels, filed Aug. 2, 2011, by Shane Chen.

FIELD OF THE INVENTION

The present invention relates to The present invention relates to vehicles having two wheels arranged generally side-by-side, as opposed to linearly as in a bicycle, and that supports a rider in a standing position. More specifically, the present invention relates to such a device in which the two wheels do not share a common axle. The present invention also relates to motorized vehicles having fore-and-aft self-balancing capabilities.

BACKGROUND OF THE INVENTION

Perhaps the best known example of a self-balancing motorized vehicle with two wheels arranged side to side that a person can ride while standing on a foot platform is the Segway, which is disclosed in U.S. Pat. No. 6,302,230 by Sramek et al (the '230 patent). The vehicle of the '230 patent has a handlebar means which serves to assist the standing rider's stability, and to carry an interface for steering the vehicle. This vehicle may be an effective short-distance transportation method, yet it has several disadvantageous aspects. These include that it is heavy, bulky, very expensive and affords a rather "stale" riding experience. Furthermore, the Segway has a large fixed-position handle bar arrangement. In contrast, a device without a handlebar (or with a smaller/compactable one) would provide greater portability (for example, it could be carried on to a bus or other mass transit) and greater convenience in mounting and dismounting, as well as the opportunity to have both hands free, all of which are advantageous in many circumstances.

However, if a rider of a vehicle without a handle bar has no points of contact with any part of the vehicle other than the foot platform surface, then he may have difficulty keeping his ankles and knees stable (and thereby controlling the device). Although the vehicle itself is capable of remaining balanced in the fore-and-aft plane, the riding stance may be too unsupported and "loose" for the average person to maintain securely and comfortably, as the rider must regulate the position of his feet and legs in relation to the vehicle in addition to directing/steering the vehicle's travel with his/her feet. Such a vehicle thus requires new ways of providing rider stability. It also requires new ways by which a rider can control the speed and turning of the vehicle. In addition, new and better ways for improving portability, stability, intuitiveness of control, and the joy/thrill of the ride are also needed.

SUMMARY OF THE INVENTION

Accordingly, it is an object of the present invention to overcome the shortcomings of the prior art.

It is another object of the present invention to provide a two-wheeled personal vehicle that has a "low-profile" permitting easy mounting and dismounting and/or a compact, portable size and weight.

It is also an object of the present invention to provide a two-wheeled personal vehicle having differentially driven wheels to execute a turn in response to side to side tilting.

These and related objects of the present invention are achieved by use of a low-profile two-wheeled self-balancing vehicle with exterior foot platforms as described herein.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIG. 11 is a side perspective view of the vehicle of FIG. 8.

FIGS. 12-16 illustrate the attachment of accessory items to the vehicle of FIG. 8.

DETAILED DESCRIPTION

In the description below, the terms pitch and tilt are used. "Pitch" is generally intended to refer to a fore-aft angle from a given reference, whereas "tilt" (in context) is generally intended to refer to the side-to-side angle from a given reference.

Figure 1:
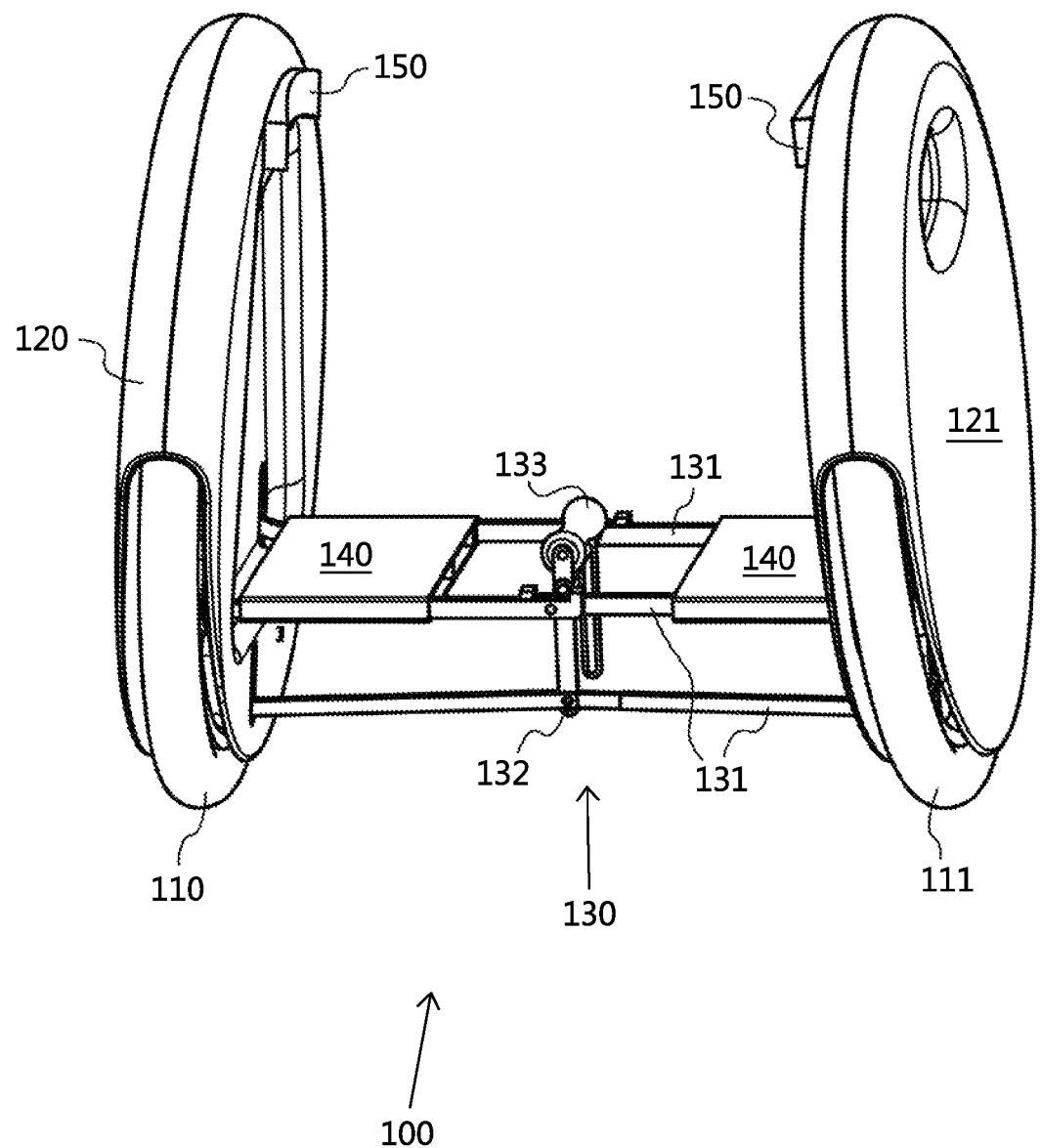
FIG. 1 is a perspective view of one embodiment of a personal vehicle in accordance with the present invention.

Referring to FIG. 1, a perspective view of a personal vehicle 100 in accordance with the present invention is shown. Vehicle 100 comprises two wheels 110 and 111, each respectively connected to a wheel support frame 120 and 121. There is a linking structure 130 coupled at one end to frame 120 and at the other end to frame 121, for connecting the two frames. Two foot platforms (or support surfaces) 140 are preferably positioned between wheels 110 and 111 for a person to stand on, and a handle 133 for carrying vehicle 110 may be coupled to linking structure 130. Wheels 110 and 111 are arranged substantially side-by-side (as opposed to linearly), yet they do not share a common axle, and are therefore independently rotatable and capable of spinning at different speeds and/or in opposite directions. The wheels may be of a wide range of sizes, but those shown in FIG. 1 are relatively large, having a diameter comparable to the length of an adult person's lower leg. Each of wheels 110 and 111 is respectively coupled to a supporting frame structure 120 and 121, which can be implemented in various possible forms as long as they connect wheels 110 and 111 to linking structure 130.

In this embodiment, frames 120 and 121 are formed as shells or housings in which wheels 110 and 111 are encased and partially enclosed. In addition to their primary function of connecting wheels 110 and 111 to linking structure 130, frame structures 120 and 121 may also serve other purposes such as supporting and guiding wheels 110 and 111, protecting wheels 110 and 111 from rain, dirt, etc., or shielding wheels 110 and 111 from coming into contact with the rider's body or clothes.

Linking structure 130 is disposed generally horizontally, and is coupled at one end to frame 120 and at the other end to frame 121. In the embodiment of FIG. 1, it comprises three linking members 131, two on the same horizontal plane and a third positioned below the first two. (Other numbers and configurations of linking members 131 are possible, provided that at least two of them are at different heights relative to the riding surface.) Linking members 131 are parallel to each other, and each is pivotably coupled to both of frames 120 and 121 such that wheels 110 and 111 can tilt from side to side relative to linking structure 130 without significantly disrupting the horizontal disposition of linking structure 130. The arrangement of at least two of linking members 131 at different heights serves to link wheels 110 and 111 to each other such that any tilting of the wheels must occur simultaneously, in the same direction, and to generally similar degrees. (If the wheels are parallel to each other their respective magnitudes of change in angle will always be substantially equal. If the wheels are cambered, their respective magnitudes of change in angle may not be substantially equal but will be generally similar.) These features of linking structure 130 are important to achieving the capability of wheels 110 and 111 to tilt or lean in the direction of a turn, which provides greater stability during turns and reduces the chances of tipping, among other benefits.

Figure 2:
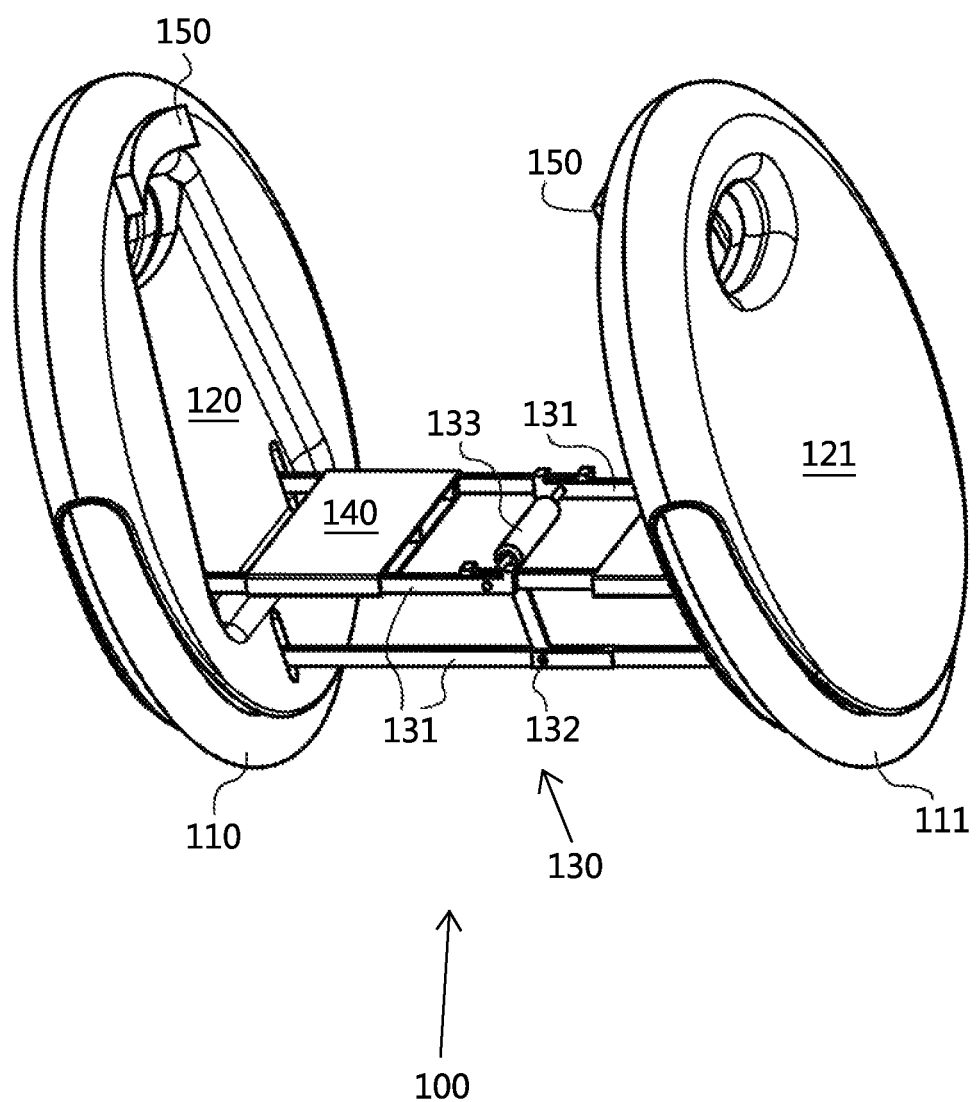
FIG. 2 is a perspective view of the vehicle of FIG. 1 with wheels tilted to one side, as during a turn.

FIG. 2 shows vehicle 100 during a left turn. In order to initiate a left turn, the rider leans sideways to the left, which pushes wheels 110 and 111 to tilt in unison to the left. (This tilting action activates a tilt-detecting means in the electronic control system, described in further detail below.) The tilting of each wheel occurs on an axis generally aligned with the direction of travel (i.e., the change in angle each wheel incurs during tilting is generally in a vertical plane oriented perpendicular to the direction of travel). Linking members 131, being pivotably coupled to both of frames 120 and 121, are not substantially angularly displaced away from horizontal; but those of linking members 131 which are positioned at different heights shift horizontally relative to each other. (It is shown in FIG. 2 that the two upper linking members have shifted left relative to the lower linking member.) This allows linking structure 130 to remain generally horizontal (or generally in a plane substantially parallel to that of the riding surface) while wheels 110 and 111 lean into the turn. Foot supports 140, being rigidly coupled to the two top linking members 131, likewise remain generally horizontal (e.g., parallel to the riding surface). These features increase safety and comfort for the rider. Additionally, the shifting action of linking members 131 result in slight shifts in horizontal and vertical position of foot supports 140, which may make it smoother and more comfortable for the rider to shift his/her weight sideways.

Note that the foot support surfaces shown in these figures are specific embodiments of a general load-bearing surface or surfaces which may support a person, and which may also be used to carry various objects even without a human rider. These load-bearing surfaces can be of various shapes and sizes and may be coupled to the linking structure or to the frame(s).

Figure 3:
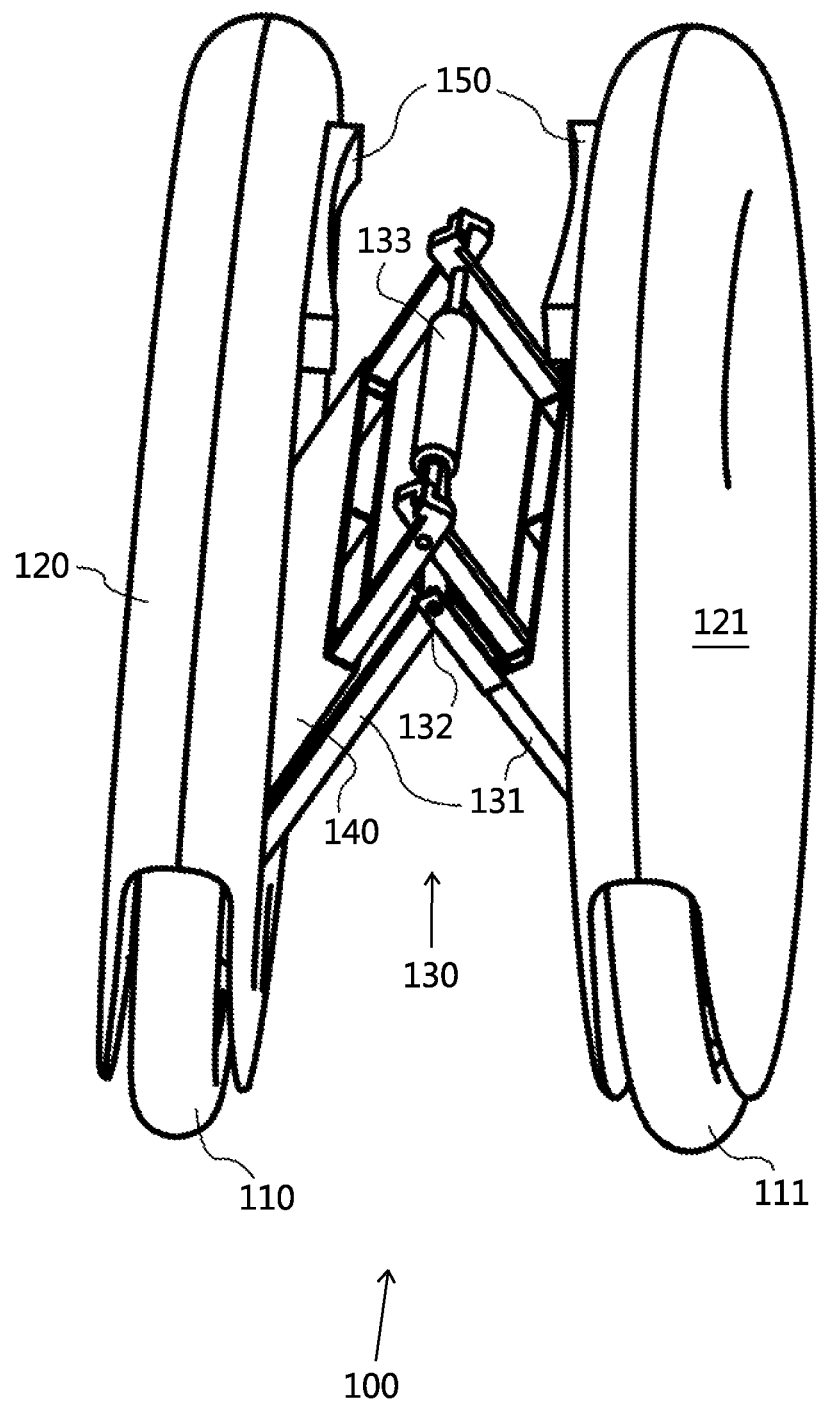
FIG. 3 is a top perspective view of the vehicle of FIG. 1 with its linking structure partially folded.

FIG. 3 shows vehicle 100 in a partially folded state. For convenience of carrying and stowage, means is provided for vehicle 100 to convert into a collapsed position in which wheels 110 and 111 are closer together than they are when the vehicle is in use. In this example, this function is achieved by folding of linking structure 130. In particular, each of the three linking members 131 has a hinge 132. In this embodiment each of hinges 132 is located in the middle of its respective linking member, but in general hinges 132 need only be arranged such that their combined folding constitutes folding of the linking structure 130.

A handle 133 may be coupled to one or more of linking members 131. In the embodiments shown, handle 133 is positioned in the middle of linking structure 130, in substantially the same vertical plane as hinges 132 (w/vehicle 100 upright). When handle 133 is pulled upward, the force transmitted to hinges 132 (in conjunction with the weight of wheels 110 and 111) causes linking structure 130 to fold, as shown in FIG. 3, bringing wheels 110 and 111 closer together. Handle 133 can then be used to carry the folded unit by hand.

Figure 4:
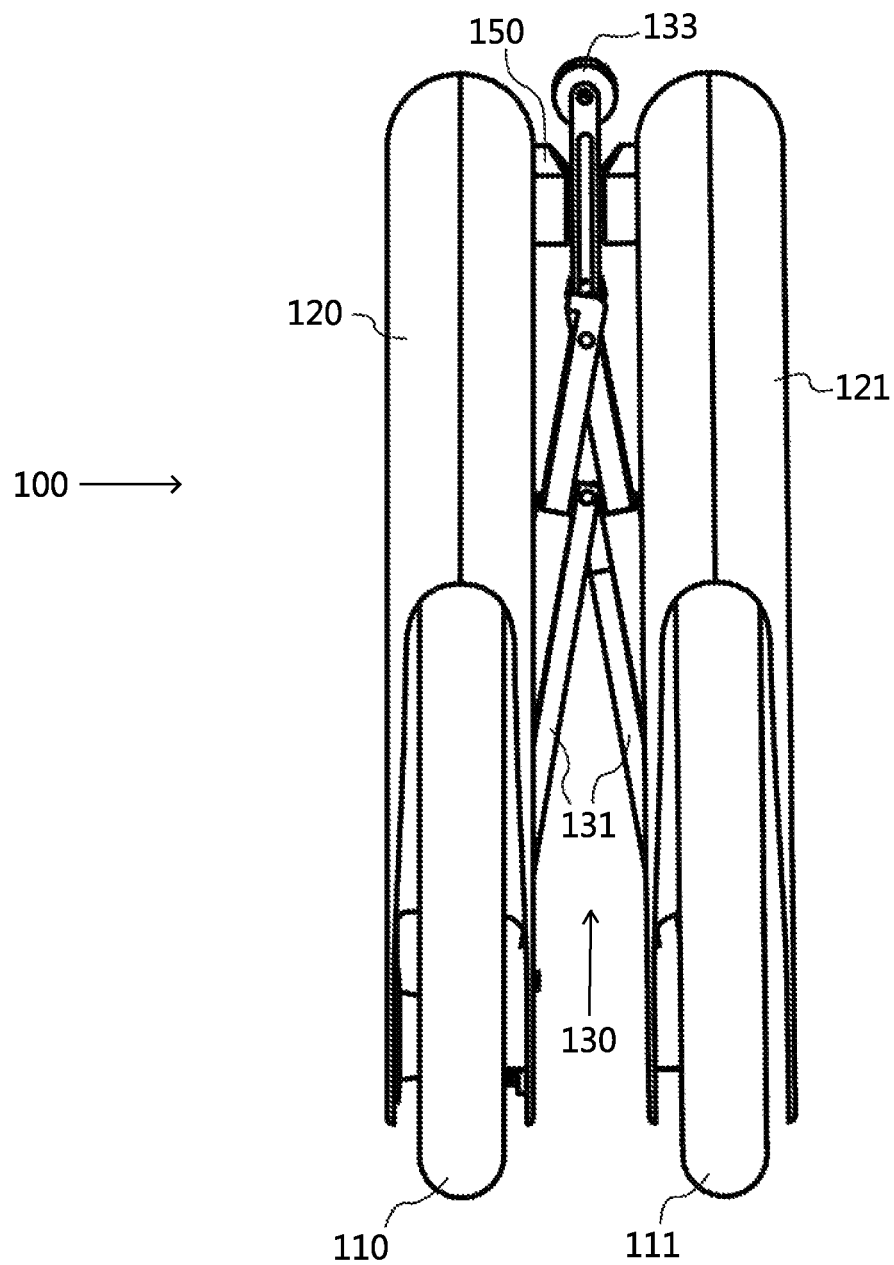
FIG. 4 is a side view of the vehicle of FIG. 1 with its linking structure fully folded and handle extended.

Handle 133 may furthermore be extendable, as in FIG. 4 where linking structure 130 is completely folded. This feature of handle 133 is embodied here as a sliding element 151 coupled to handle 133 rigidly, and coupled to linking members 131 so as to be vertically movable through a certain range. Sliding element 151 therefore allows handle 133 to move vertically relative to its point(s) of attachment to linking structure 130. When handle 133 is pulled upward it first slides to its fully extended position; further upward force causes linking structure 130 to fold as described above (and shown in FIG. 4). Handle 133 and sliding element 151 is configured such that when linking structure 130 is fully folded, handle 133 extends beyond the topmost edges of wheels 110 and 111 and/or frames 120 and 121, thereby allowing a person to carry vehicle 100 with her hand clear of the wheels and the frames. This provides for greater comfort for the person carrying the vehicle, and also allows the wheels to be very close together in folded position.

Note that there exist other possible ways, other than the specific sliding mechanism described here, by which the handle may be made to extend beyond the wheels and the frames.

In order to achieve optimum stability, the rider preferably stands with his lower legs firmly in contact with frames 120 and 121. This creates multiple points of contact between the rider and the vehicle so that the rider can easily hold his feet and lower legs in position. To aid in this, vehicle 100 further comprises two leg contact surfaces 150, one coupled to each of frames 120 and 121. Leg contact surfaces 150 are affixed to the inward-facing sides of frames 120 and 121, and positioned such that they can come into contact with the lower legs of a rider standing with one foot on each of foot support surfaces 140. Leg contact surfaces 150 may be made from a soft, yielding, and/or textured material, in order to provide friction which aids the rider in stabilizing his legs against frames 120 and 121. They may furthermore be slightly curved concavely around a substantially vertical axis to fit the general shape of the rider's legs.

Figure 5:
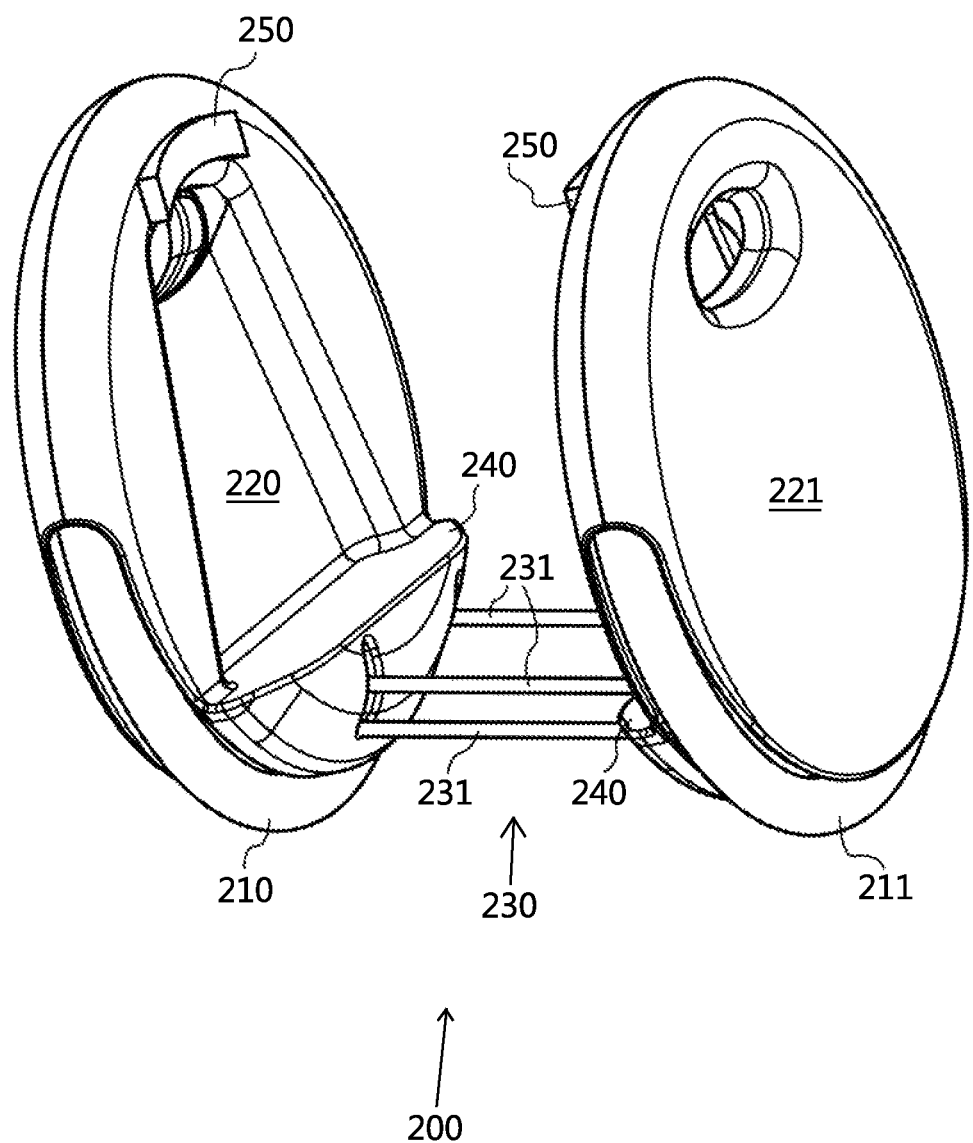
FIG. 5 is a perspective view of a different embodiment of a personal vehicle in accordance with the present invention, with wheels tilted to one side as during a turn.

FIG. 5 shows a perspective view of another embodiment of a vehicle 200 in accordance with the present invention. Vehicle 200 may include wheels 210 and 211, frames 220 and 221, linking structure 230 with linking members 231, and leg contact surfaces 250, which perform essentially the same functions as their counterparts in vehicle 100. (This embodiment does not include means for folding linking structure 230, or a handle.) Vehicle 200 may also include two foot support platforms 240, one of which is rigidly coupled to the inward-facing side of each of frames 220 and 221. These foot support platforms 240 may be individual pieces which are rigidly coupled to frames 220 and 221, or they may simply be each molded from the same piece of material as their respective frames 220 and 221.

Figure 6:
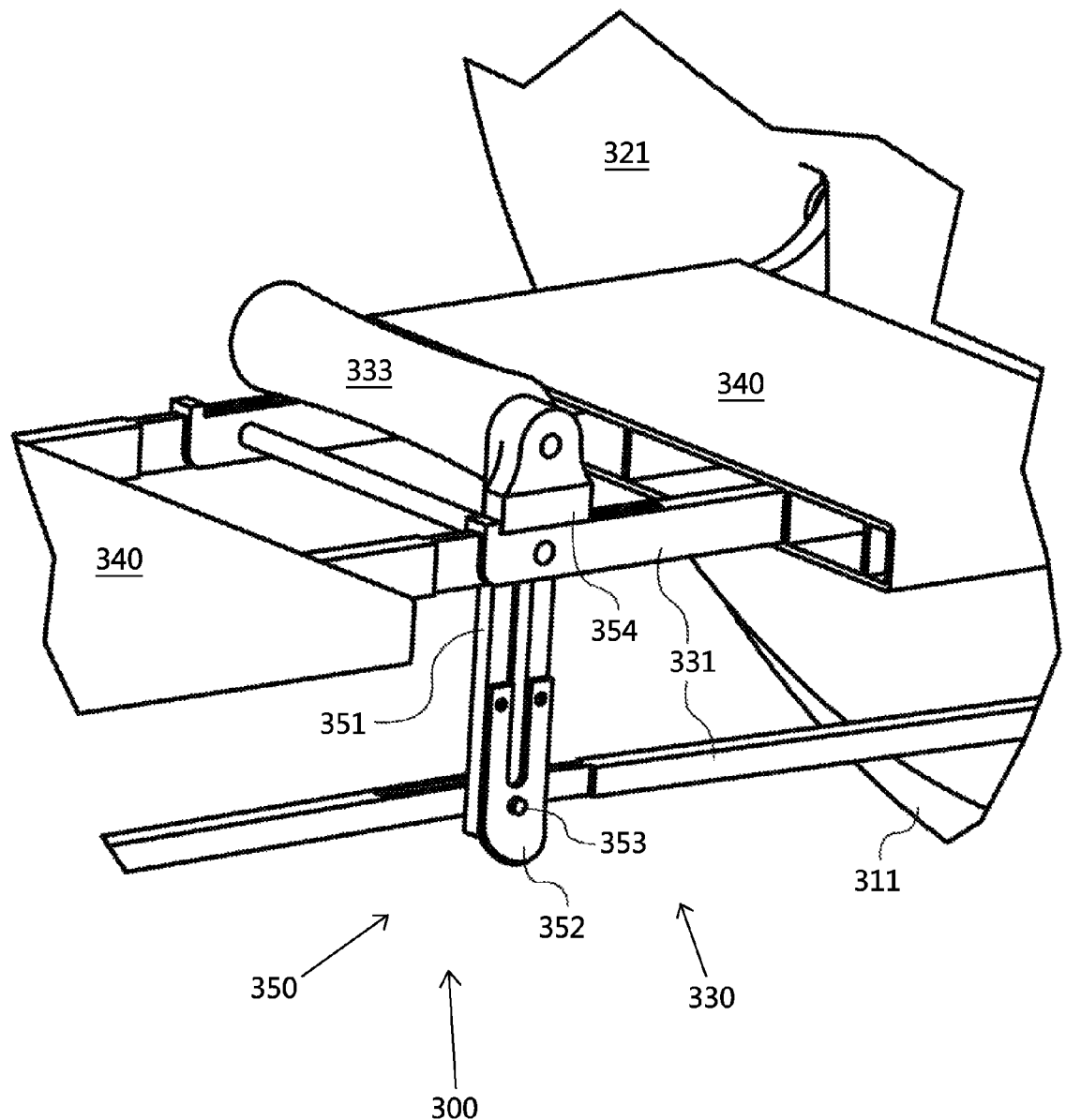
FIG. 6 is a detail of a perspective view of another embodiment of a personal vehicle, having a bias means and locking mechanism in accordance with the present invention.

FIG. 6 shows a detail of a perspective view of a vehicle 300. In addition to the same features of vehicle 100, vehicle 300 may further include a bias piece 354, and a locking mechanism 350 associated with handle 333. Handle 333 is rigidly coupled to sliding element 351, which is capable of sliding substantially vertically relative to linking structure 330, thus handle 333 is extendable in the same manner as previously described for vehicle 100. Bias piece 354 is made of an elastic material such as rubber, and is firmly attached to either handle 333 or linking structure 330 such that it can be pinned between some part of handle 333 and some part of one of linking members 331. In the embodiment shown, bias piece 354 is formed as a rectangular block firmly attached beneath one end of handle 333. Vehicle 330 can be converted from a folded position (see FIGS. 3 and 4) into an unfolded position by pushing downward on handle 333 while vehicle 300 is set generally upright on a surface. Starting from its fully extended position, handle 333 first slides downward along sliding element 351, and then further downward force causes linking structure 330 to unfold until linking members 331 are substantially straight and bias piece 354 is in contact with both handle 333 and one of linking members 331. Locking mechanism 350 engages to hold the structure in this position.

The locking mechanism 350 of this embodiment has a locking piece 352 rigidly coupled to sliding element 351. Locking piece 352 engages with locking pin 353 on the lower linking member, and prevents linking structure 330 from folding when not desired (due to the elasticity of bias piece 354 or any other cause). When the wheels lean during a turn, linking members 331 shift horizontally relative to each other as previously described. Handle 333 remains in the same position relative to the upper two linking members, and locking piece 352 remains engaged with locking pin 353 on the lower linking member. The resultant tension created in sliding element 351 deforms and/or compresses bias piece 354, which due to its elasticity tends to return to its original shape, thereby biasing the entire structure to a neutral, non-turning position (i.e., a position in which the wheels are not substantially tilted to the left or to the right and are substantially mirror images of each other).

Figure 7:
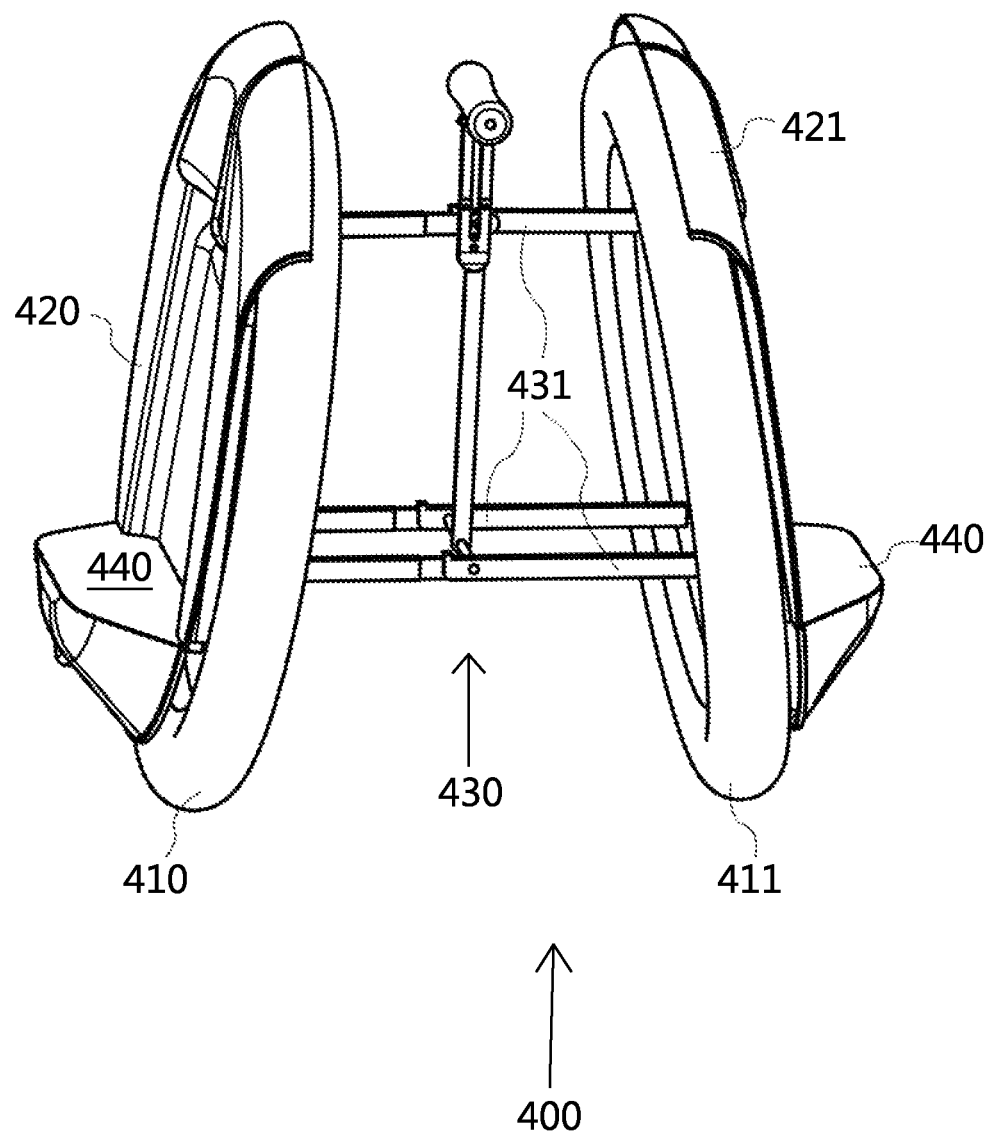
FIG. 7 is a perspective view of another embodiment of a personal vehicle in accordance with the present invention.

FIG. 7 shows a perspective view of a vehicle 400 in accordance with the present invention. Vehicle 400 has features similar to those of the previous embodiments, including a foldable linking structure 430. However, the foot support platforms 440 are on the outward-facing sides of their respective wheel frames 420 and 421, instead of being between the two wheels 410 and 411 as in the prior embodiments. The rider stands with her lower legs against the sides of frames 420 and 421, and accordingly the leg contact surfaces are also on the outward-facing sides of wheel frames 420 and 421. Wheels 410 and 411 may be cambered, and the camber angle may generally fit the angle of the rider's legs. One benefit resulting from this outside-standing arrangement is that linking structure 430 between the two wheels may occupy more vertical space that in the inside-standing arrangements. Having greater difference in height between the lower and the upper linking member(s) 431 provides an advantage in stability-linking structure 430 has more leverage to synchronize the tilting of wheels 410 and 411.

Each wheel is driven by a respective motor. In the embodiments shown, the motors are housed within their respective frames and are not exposed. The motors are directed by an electronic control means which enacts automatic fore-and-aft balancing of the vehicle. (A single electronic control device may control both motors, or each wheel may have its own independent electronic control device that controls the respective motor.) The electronic control device is capable of sensing forward or backward tilting or change in "pitch" of the vehicle—by gyrosensors, accelerometer, or other means known in the art—and responds by directing the motors to accelerate or decelerate appropriately in order to maintain equilibrium in a fore-and-aft balanced position. The same mechanism enables the rider, standing on foot support platforms, to direct the vehicle's forward and backward travel through shifting of her center of gravity. She can shift her weight forward or backward to cause the vehicle to accelerate in that direction, and can shift her weight in the direction opposite that in which the vehicle is moving to cause the vehicle to decelerate.

As described above, the rider may initiate a turn by leaning sideways toward the desired direction of the turn, whereupon the wheels tilt sideways, remaining in contact with the rider's legs, and the linking members shift horizontally relative to each other. The electronic control device preferably includes a sensor and logic for detecting and processing one or more of these changes. For example, the electronic control device may sense the sideways tilting of one or more of the wheels (via gyroscope, accelerometer, etc.). It then adjusts the respective speeds and/or directions of one or both of the wheels, thereby creating a difference in velocity which causes the vehicle to turn toward the direction in which the rider has shifted her weight. The combination of these steering controls and the fore-and-aft controls create a simple and intuitive means for a rider to operate the vehicle.

The motors may drive the wheels through a type of drive mechanism known in the art and sometimes called a "friction drive". For instance, each of the two motors may drive a spinning cylindrical component which may have a small radius compared to that of the wheel, and which is in contact with the inner rim of the wheel. Friction between the surface of the spinning component and the inner rim of the wheel provides the grip necessary for the motor to transmit torque to the wheel. The friction drive mechanisms may be used in conjunction with hubless wheels, which are substantially lighter-weight than wheels having center hubs, and hence enhance the portability of the vehicle.

Figure 8:
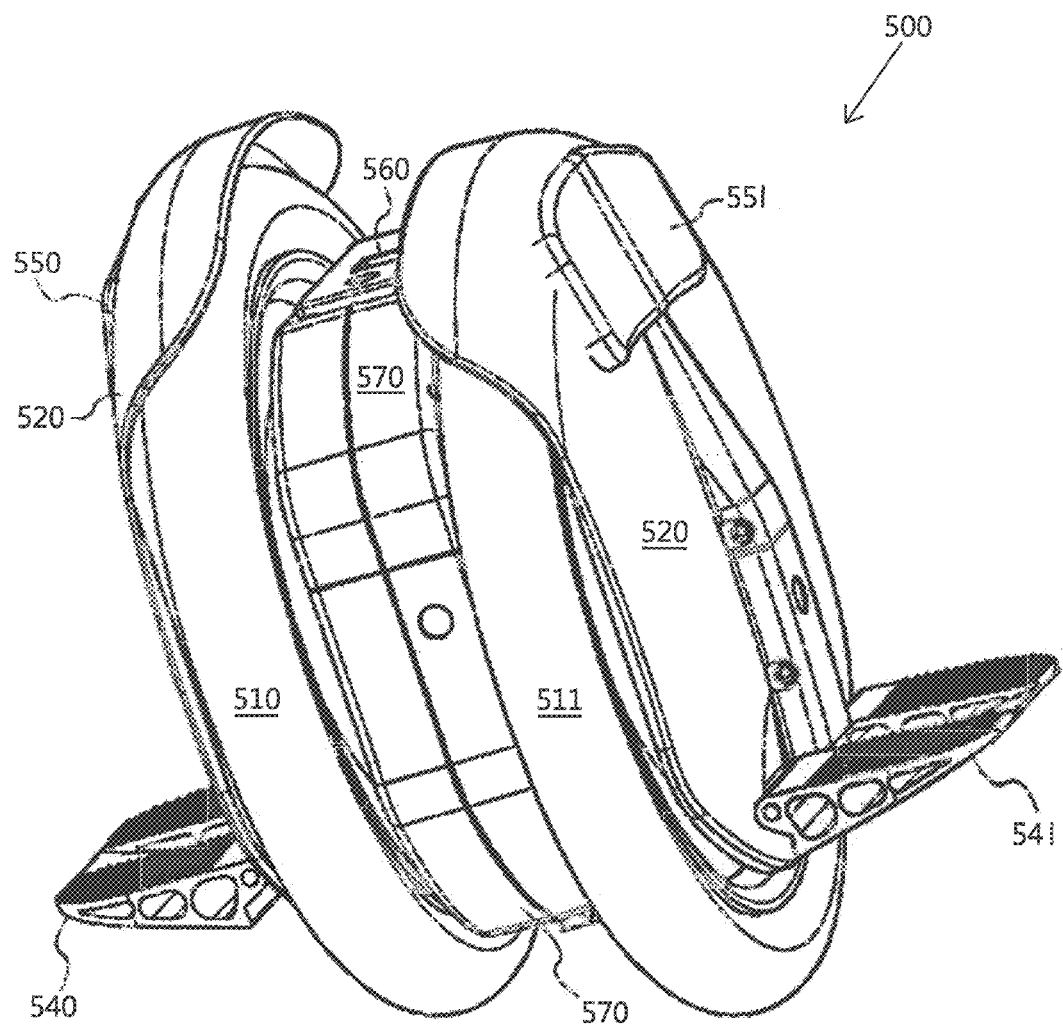
FIG. 8 is a perspective view of another embodiment of a vehicle in accordance with the present invention shown.
Figure 9:
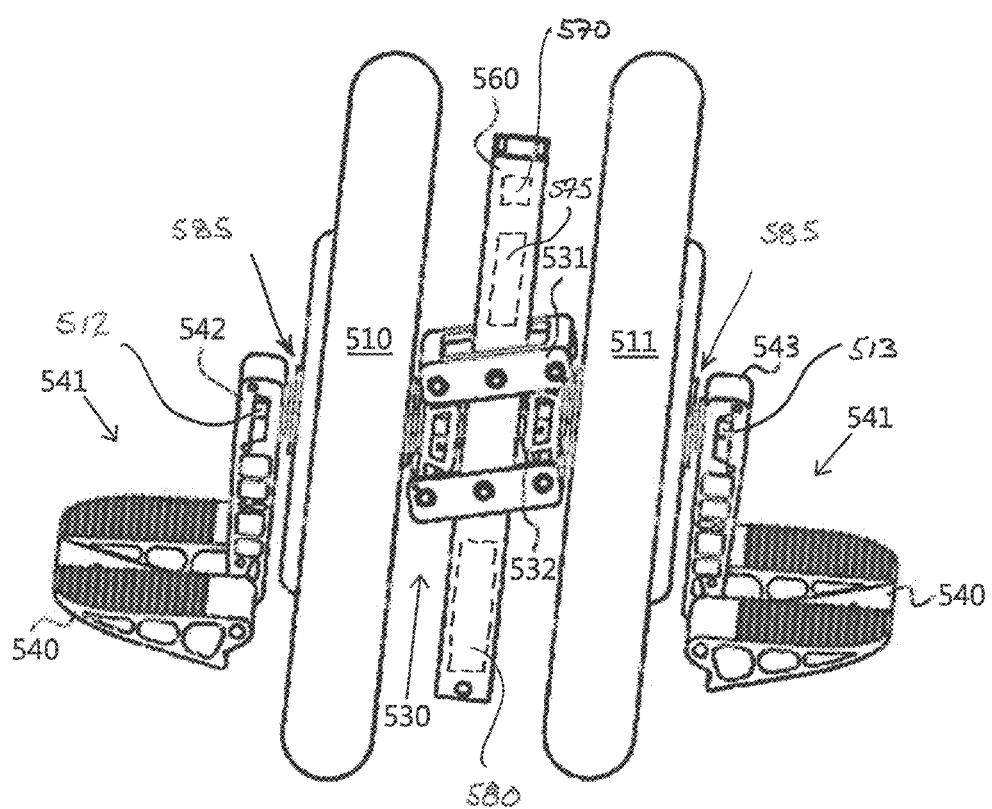
FIG. 9 is a perspective view of the vehicle of FIG. 8 with the casings and housing removed so that the linkage structure and other components may be seen.

Referring to FIG. 8, a perspective view of another embodiment of a vehicle 500 in accordance with the present invention shown. Referring to FIG. 9, vehicle 500 is shown with the casings 520 and the housing 570 removed so that linkage structure 530 and other components may be seen.

Vehicle 500 may have two wheels 510,511 that are coupled to shafts 512,513, respectively, or otherwise attached. A linking structure 530 (FIG. 9) is preferably coupled to and between shafts 512 and 513. The linking structure functions to support shafts 512,513 and maintain them in a relative position as vehicle 500 tilts from side to side and wheels 510,511 tilt in a similar manner. Linkage structure 530 is discussed in more detail below with reference to FIG. 9. Foot platforms 540,541 are preferably attached to each shaft 512, 513, respectively, exterior of the wheel. Leg pads 550,551 are preferably disposed above each foot platform 540,541.

Wheels 510 and 511 are arranged substantially opposite (side to side) one another about a central plane. The central plane may approximately or essentially be the plane of side-to-side tilt. The wheels 510, 511 do not share a common axle and, therefore, are capable of spinning at different speeds and/or in opposite directions about their respective shafts.

Foot platforms 540,541 are coupled to the outward end of their respective shafts 512,513, and are configured to support a standing rider. Each foot platform 540,541 may be coupled through a vertical strut 542,543 on the outward end of its respective shaft. A foot platforms 540,541 may be coupled to vertical strut 542,543 such that it is movable between an approximately horizontal position for riding, and an approximately vertical position for carrying and stowing. Leg pads 550,551 are preferably positioned such that they can come into contact with the lower legs of a rider standing with one foot on each foot platform 540,541.

Wheels 510 and 511 may be covered to some extent by hard casings 520 for preventing the rider's legs and/or clothing from touching the wheels during use. In the embodiment of FIG. 8, casings 520 cover the majority of the outward-facing area defined by each wheel, and are attached to vertical struts 542,543. Leg pad 550,551 are preferably affixed to the surface of each casing 520, and positioned to contact a rider's lower leg when standing on the foot platforms. As with the leg pads of the previously described embodiments, leg pads 550,551 are preferably made of a yielding material in order to provide friction with the rider's legs. Also, the casing exterior surface may have a concave shape at the leg pad attachment region to aid in secure leg contact and thereby enhance vehicle control (as discussed above for the embodiments of FIGS. 1-7). These points of contact enable close tactile connection between user and vehicle which in turn affords precise control of the speed and turning of the vehicle. While providing desired connection and control, this foot platform and leg pad arrangement, also permits a user to readily exit or abandon the vehicle to avert a fall or accident (without a foot getting tangled up with the vehicle).

FIG. 9 shows the vehicle of FIG. 8 with casings 520 and housing 570 removed to expose linking structure 530. Linking structure 530 is coupled to wheel shafts 512,513, and may include two horizontal linking pieces 531 and two vertical linking pieces 532. While these members or pieces 531,532 are termed "horizontal" and "vertical," respectively, it is clear that they are not necessarily horizontal or vertical. The horizontal pieces may be generally horizontal when the vehicle is on a horizontal riding surface. If, however, the riding surface is not horizontal, the horizontal member will not in fact be horizontal but will take the inclination of the riding surface. Similarly, while the vertical pieces may be vertical when the horizontal members are horizontal, the vertical member will tilt off vertical as the wheels tilt from side to side, etc.

Collectively, the horizontal and vertical linking pieces may form or approximate a parallelogram. Horizontal linking pieces 531 may be rectangularly shaped with space in their centers to allow a hollow column 560 to pass through. Both horizontal linking pieces 531 are preferably pivotably coupled to vertical linking pieces 532 such that, while all of the linking pieces 531 and 532 can change relative positions, horizontal linking pieces 531 remain substantially parallel to each other, and vertical linking pieces 532 likewise remain substantially parallel to each other. This configuration of linking structure 530 functions according to the same principle as the linking structures of the previously described embodiments. Like the linking structures of previous embodiments, the parallelogram configuration of linking structure 530 coordinates the tilting angles of wheels 510 and 511, linking them together such that any tilting of wheels 510 and 511 must occur in unison. These features of linking structure 530 are important to achieving the capability of wheels 510 and 511 to tilt or lean in the direction of a turn.

The vertical member 532 are in turn coupled to shafts 512,513 and their associated hub structure 585. Mechanisms for securely connecting to a rotation shaft are know in the art. Each hub structure 585 preferably includes a motor for individually and/or uniquely driving each wheel. Motorized hubs are know in the art.

Vehicle 500 preferably includes a position sensor 570, control logic 575 and a battery 580. These components are drawn in dashed-line representative blocks so as to not obscure other components and because their size, location and/or configuration may be variable. Sensor 570 detects fore-aft position (ie, pitch) similar to the sensor of the Segway and related devices. Sensor 570 also detects side-to-side tilt, preferably from a gravitational vertical, in contrast to an axis perpendicular to the riding surface. Sensor 570 may be a gyroscopic sensor. Suitable sensors are known in the art.

Battery 580 may take different forms and may evolve as battery technologies evolve without departing from the present invention. The battery is preferably coupled to frame column 560 and enclosed in housing 570. Control logic 575 preferably includes electronic controls for processing sensor data and driving hub motors in response thereto.

Figure 10:
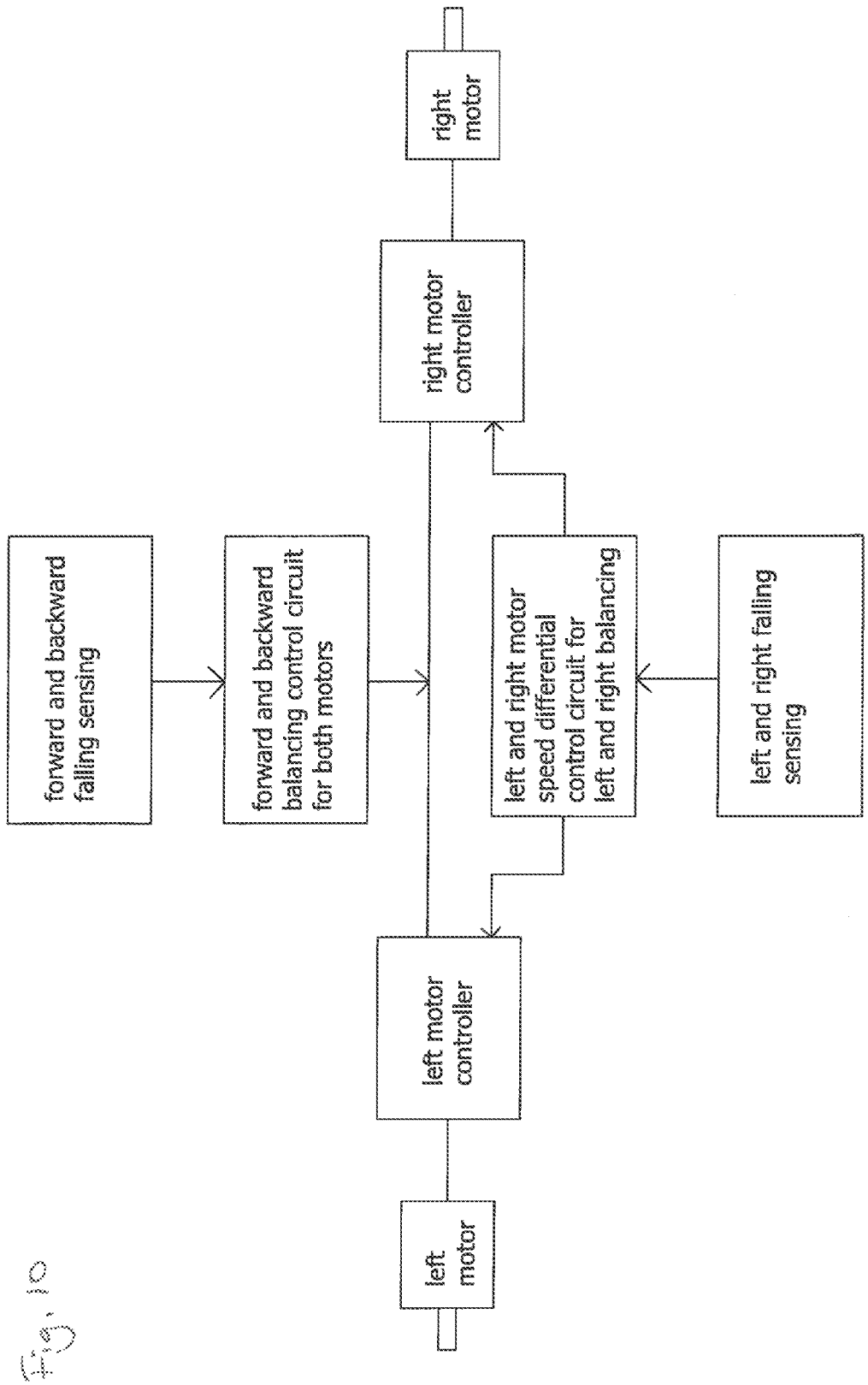
FIG. 10 is a block diagram of control logic for the vehicle of FIG. 8.
Figure 14:
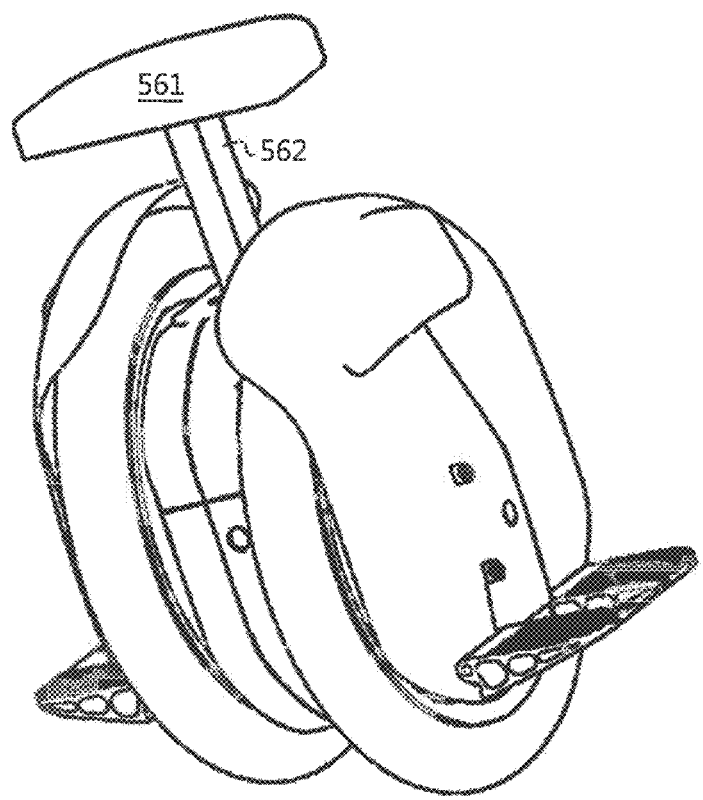

Referring to FIG. 10, a block diagram 590 of processing by controller or control logic 575 is shown. Blocks 591,592 represents the input of sensor pitch and tilt values respectively from sensor 570. For fore-aft balance, the speed and rotation direction of wheels 510,511 is determined (593) and transmitted to the respective motor controllers 594,595, which in turn drive the left and right motors 586,587 within their hub structures 585. In one embodiment, tilting to a given side induces turning that direction. This may be achieved by adjusting the speed of the left and right motors 586,587 (and their associated wheels 510,511) relative to one another such that the outside wheel spins faster than the inside wheel, thereby affecting the turn. Speed differential logic 596 determines appropriate wheel speed for each wheel and propagates that to the respective motor controllers 594,595. Additional speed adjustments, such as slowing into a curve, may be implemented.

Referring to FIG. 11, a perspective side view of vehicle 500 with the casings 520 removed is shown. Among other aspects, FIG. 11 illustrates a wheel support structure 525 that supports the tire 511 and effectively connects it to the hub 585/axle 513. Support structure 525 may be a solid piece as shown, or spoked or otherwise arranged. Vertical strut 543 and foot platform 541 are also shown.

Figure 15:
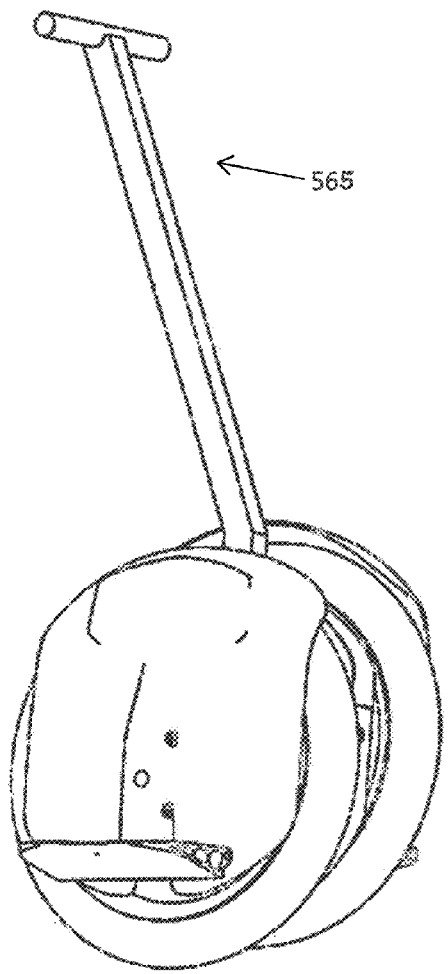
Figure 16:
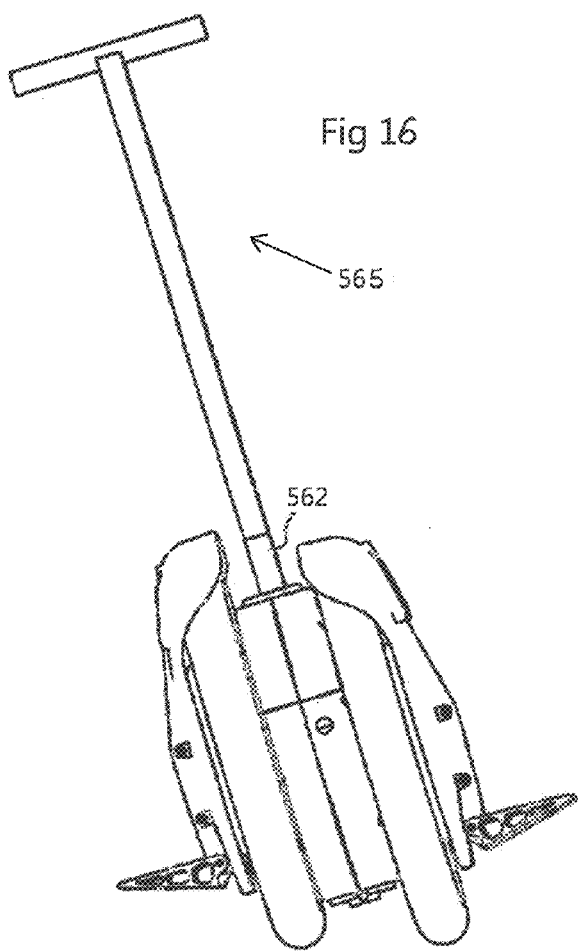

It may be useful to have the option of attach a seat or a carrying handle to vehicle 500. Referring to FIGS. 12-16, an attachment point for such accessories may therefore be provided on vehicle 500. The attachment point may be column 560 disposed generally vertically between wheels 510 and 511 or another attachment structure. An attaching shaft 562 may be inserted into column 560 to support/connect the accessories (or the accessories can be directly inserted/connected to vehicle 500). Possible accessories include a carrying handle 563 (FIGS. 12 and 13), a seat 564 (FIG. 14), or a longer handle 565 (FIGS. 15 and 16). It should be recognized that the handle and/or seat, etc., could telescope within column structure 560.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A two-wheeled personal vehicle, comprising:
a first and a second wheel arranged substantially side-by-side about a center plane;
first and second foot platforms respectively coupled on the exterior side of each of the first and second wheels;
a linkage assembly coupled to the first and second wheels and configured to hold the wheels in a substantially parallel arrangement as the wheels tilt from side to side;
first and second motors respectively coupled to the first and second wheels;
a side-to-side tilt sensor; and
control logic coupled between the sensor and the first and second motors;
wherein in response to a sensed sideways tilt of the wheels, the control logic drives the first and second motors at different speeds so that the vehicle affects a turn.

2. The vehicle of claim 1, wherein the first and second wheels respectively rotate about a first and a second shaft and a first and second strut member are respectively coupled to each of the shafts, the strut members extending substantially downward to a greater extent than upward; and
further wherein the first foot platform is coupled toward a bottom of the first strut member and the second foot platform is coupled toward a bottom of the second strut member.

3. The vehicle of claim 2, wherein first and second foot platforms are movably coupled to their respective strut members.

4. The vehicle of claim 2, further comprising a first and a second foot casing, the casings respectively coupled to the first and second strut members.

5. The vehicle of claim 1, wherein the first and second motors are located in a hub structure of their respective wheels.

6. The vehicle of claim 1, further comprising a first and a second leg pad respectively positioned above the first and the second foot platforms and configured so as to contact the side yet not the front or back of a users leg that is standing on the first and second foot platforms, astride the first and second wheels.

7. The vehicle of claim 1, wherein the leg pads are at least one of: concave in shape and made of pliable material.

8. The vehicle of claim 1, further comprising a fore-aft pitch sensor coupled to said control logic to sense fore-aft balance, and wherein said control logic drives said first and second motors to approach fore-aft balance based on the pitch detected by the pitch sensor.

9. The vehicle of claim 1, further comprising a column structure mounted through said linkage assembly to which an accessory item is coupled.

10. A two-wheeled personal vehicle, comprising:
a first and a second wheel arranged substantially side-by-side about a center plane;
first and second foot platforms respectively coupled on the exterior side of each of the first and second wheels;
a linkage assembly coupled to the first and second wheels and configured to hold the wheels in a substantially parallel arrangement as the wheels tilt from side to side; and
first and second leg pads respectively positioned above the first and the second foot platforms and configured so as to contact the side yet not the front or back of a users leg that is standing on the first and second foot platforms, astride the first and second wheels.

11. The vehicle of claim 10, wherein the leg pads are at least one of: concave in shape and made of pliable material.

12. The vehicle of claim 10, further comprising a fore-aft pitch sensor, control logic and a motor coupled to the first and second wheels, wherein the control logic signals the motor to drive the first and second wheel in a manner to achieve fore-aft balance based on the pitch detected by the pitch sensor.

13. The vehicle of claim 12, further comprising a side-to-side tilt sensor coupled to the control logic; and wherein in response to a sensed sideways tilt of the wheels, the control logic controls the motor such that the first and second wheels are driven at different speeds to affects a turn.

14. The vehicle of claim 10, wherein the first and second wheels respectively rotate about a first and a second shaft and a first and second strut member are respectively coupled to each of the shafts, the strut members extending substantially downward to a greater extent than upward; and
further wherein the first foot platform is coupled toward a bottom of the first strut member and the second foot platform is coupled toward a bottom of the second strut member.

15. The vehicle of claim 14, wherein first and second foot platforms are movably coupled to their respective strut members.

16. A two-wheeled personal vehicle, comprising:
a first and a second wheel arranged substantially side-by-side about a center plane;
first and second foot platforms respectively coupled on the exterior side of each of the first and second wheels; and
a linkage assembly coupled to the first and second wheels and configured to hold the wheels in a substantially parallel arrangement as the wheels tilt from side to side;
wherein the first and second wheels respectively rotate about a first and a second shaft and a first and second strut member are respectively coupled to each of the shafts, the strut members extending substantially downward to a greater extent than upward; and
further wherein the first foot platform is coupled toward a bottom of the first strut member and the second foot platform is coupled toward a bottom of the second strut member.

17. The vehicle of claim 16, further comprising a first and a second leg pad respectively positioned above the first and the second foot platforms and configured so as to contact the side yet not the front or back of a users leg that is standing on the first and second foot platforms, astride the first and second wheels.

18. The vehicle of claim 16, further comprising first and second motors respectively coupled to the first and second wheels;
a side-to-side tilt sensor; and
control logic coupled between the sensor and the first and second motors;
wherein in response to a sensed sideways tilt of the wheels, the control logic drives the first and second motors at different speeds so that the vehicle affects a turn.

19. The vehicle of claim 18, further comprising a fore-aft pitch sensor coupled to the control logic to sense fore-aft balance, and wherein the control logic drives said first and second motors to approach fore-aft balance based on the pitch detected by the pitch sensor.

20. The vehicle of claim 16, further comprising a column structure mounted through said linkage assembly to which an accessory item is coupled.

* * * * *